United States Patent [19]

Garabedian et al.

[11] Patent Number: 4,811,390

[45] Date of Patent: Mar. 7, 1989

[54] CONTROL CIRCUIT FOR MOBILE TELEPHONE WITH FULL DUPLEX OPERATION CAPABILITY

[75] Inventors: Arthur Garabedian, Fullerton; William R. Thompson, Diamond Bar, both of Calif.

[73] Assignee: Western Mobile Telephone Co., Anaheim, Calif.

[21] Appl. No.: 74,159

[22] Filed: Jul. 16, 1987

Related U.S. Application Data

[63] Continuation of Ser. No. 777,722, Sep. 19, 1985, abandoned.

[51] Int. Cl.$^4$ ............................................. H04M 9/08
[52] U.S. Cl. ...................................... 379/390; 379/56
[58] Field of Search ................ 379/58, 56, 388, 389, 379/390, 387, 409, 406, 407; 370/32.1

[56] References Cited

U.S. PATENT DOCUMENTS 4,715,063 12/1987 Haddad et al. ...................... 379/390

Primary Examiner—Jin F. Ng
Assistant Examiner—Randall S. Vaas
Attorney, Agent, or Firm—G. Donald Weber, Jr.

[57] ABSTRACT

A circuit which is used with a portable or mobile telephone system. The circuit is arranged to be installed between the telephone control unit and the radio transceiver used in mobile telephone systems. The circuit permits "normal" telephone usage with the telephone handset, as well as "hands-free" or speaker-phone operation. Also, duplex (i.e. bidirectional) operation is achieved by reducing, but not eliminating, two-way signal transmission through the circuit.

18 Claims, 2 Drawing Sheets

CONTROL CIRCUIT FOR MOBILE TELEPHONE WITH FULL DUPLEX OPERATION CAPABILITY

This is a continuation of application Ser. No. 777,722 filed Sept. 19, 1985 now abandoned.

BACKGROUND

1. Field of the Invention

This invention is directed to telephone control circuits, in general, and to circuits which control the operation of mobile telephones, such as automobile phones, in particular.

2. Prior Art

Mobile telephones have been known in the art for many years. One of the most prominent uses of mobile telephones is in automobiles. In the past, this type of telephone system has not been widely accepted because of the difficulties in setting up the operation thereof. For example, the communications were frequently readily receivable by undesirable reception systems. Moreover, the transmitter for the "calls" was usually fixed and had limited radiation capabilities. Consequently, the phone reception became poor or marginal as the phone instrument moved throughout the geographical area served by the transmitter. However, with the advent of the cellular phone system, the problems of quality of the call tansmission have improved. Consequently, more and more mobile telephones are being installed.

However, in the past, most of the mobile telephones suffered from the lack of "hands-free" operation. This required the phone user to manipulate the instrument with one hand while operating the mobile vehicle, e.g. automobile, with the other hand. This was an undesirable situtation, as well as an unsafe one.

Furthermore, the prior art systems were frequently limited to simplex or one way transmission. Thus, one speaker or user of the phone would have control over the system. By merely continuing to talk, one party could "lock-out" the other party. This was disadvantageous in many cases as well as being annoying or bothersome in other cases.

Consequently, it is highly desirable to have a mobile phone system which is capable of both hands-free and duplex operation.

SUMMARY OF THE INVENTION

This invention comprises a circuit which has the appropriate electronics therein to permit the audio section to receive and/or transmit, as the case may be, in satisfactory manner. The circuitry also includes the adaptability to utilize a microphone and/or a speaker so that hands-free operation can be achieved.

More importantly, the circuit also includes appropriate interaction and/or automatic gain control (AGC) circuitry which reduces noise, permits duplex operation and retains a high quality of sound transmission.

DESCRIPTION OF A PERFERRED EMBODIMENT

Figure 1:
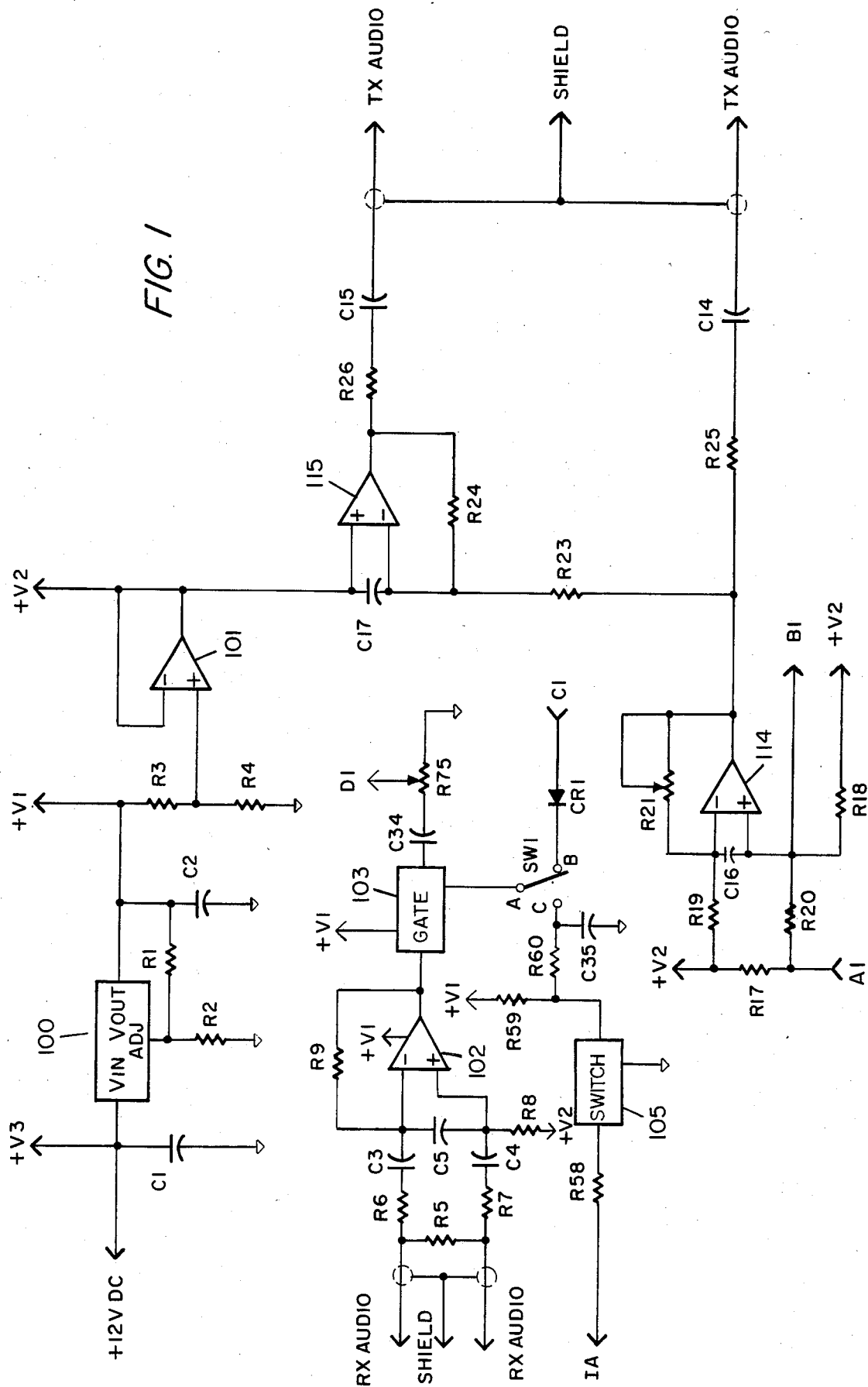
FIGS. 1 and 2 are schematic diagrams of interrelated portions of the circuitry of the instant invention.
Figure 2:
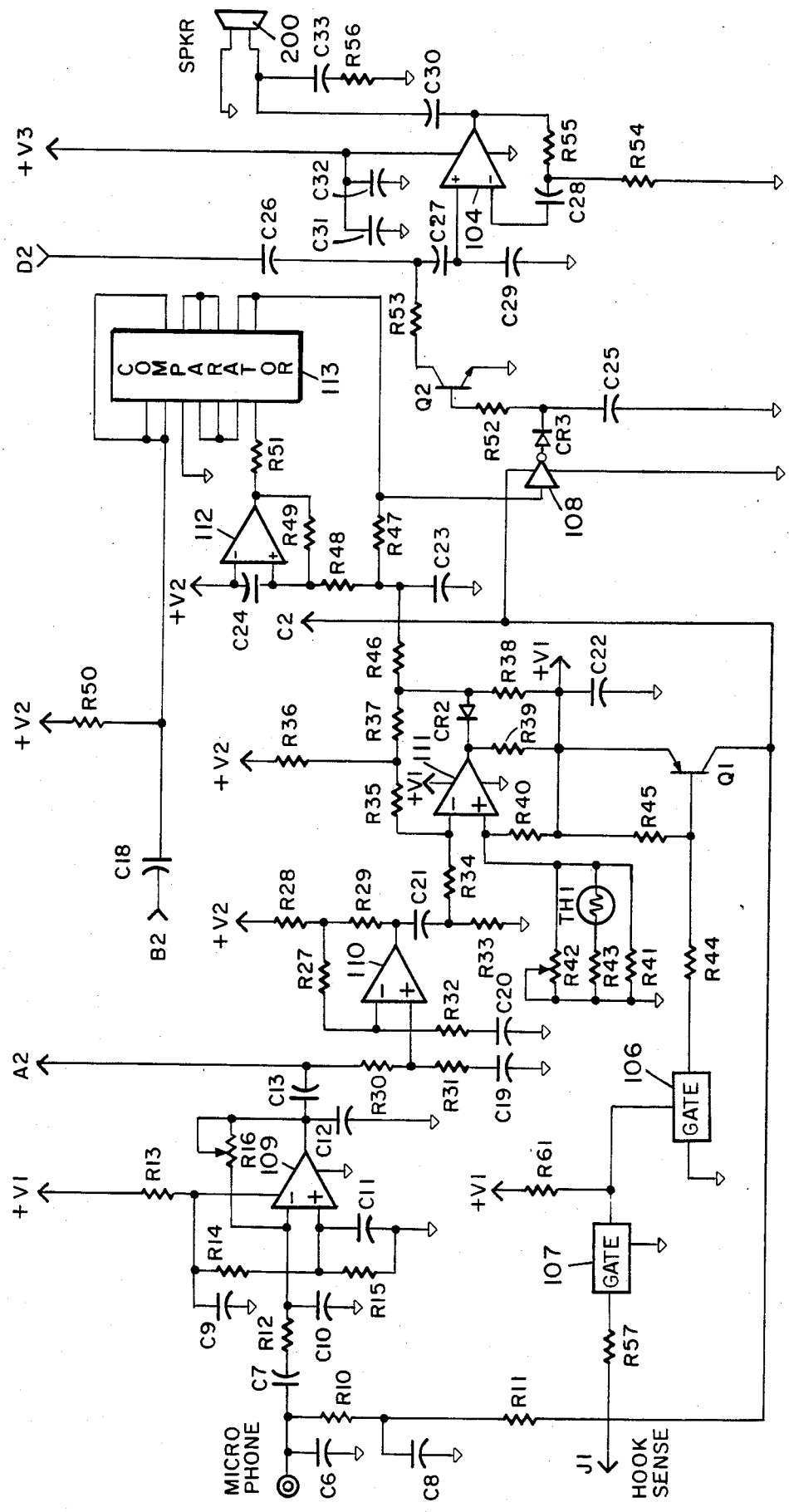

Referring concurrently to FIGS. 1 and 2, there is shown the system of the instant invention which includes a suitable power supply for the system. The power supply includes the voltage regulator 100 which is connected to a suitable source such as a 12 volt battery. In one embodiment, the source provides the 12 volts via a control cable which is switched by radio. In this circuit, capacitor C1 is the input filter capacitor which removes any noise from the +V3 signal. Resistors R2 and R1 form a voltage setting voltage divider with regard to the voltage regulator 100. Capacitor C2 is an output filter capacitor which smooths the +V1 signal. Resistors R3 and R4 form a voltage divider that provides the reference voltage to buffer circuit 101 which supplies voltage +V2. In the preferred embodiment, +V1 is a +8 volt signal while +V2 and +V3 are +4 volt and +12 volt signals, respectively. These voltage signals are supplied to the remainder of the circuit as shown.

The balanced input audio signal is supplied to the two Rx audio inputs via a shielded cable. This signal passes through resistors R6 and R7, with R5 connected thereacross, to provide the balanced 600 ohm termination of the input line. The signal then passes through blocking capacitors C3 and C4 to operational amplifier 102 to provide the single ended audio from the balanced audio input. Capacitor C5 provides a high frequency RF bypass at one input of amplifier 102. Resistor R8 provides a bias or reference signal at the non-inverting input to amplifer 102. Resistor R9 is used to control the gain of the stage. Circuit 103 is used to gate the audio on and off. The control signal to turn the circuit 103 on and off is supplied via switch SW1. The control signal is, selectively, supplied at switch terminal B from terminal C1 or at switch terminal C from an alternative input system as described infra. The output of circuit 103 is supplied to the volume control device represented by variable resistor R75 via DC blocking capacitor C34.

The output signal from resistor R75 is produced at terminal D1 which is connected to terminal D2 in FIG. 2. Terminal D2 is connected to DC blocking capacitor C26 and to resistor R53 which determines the level of reduction of speaker audio. Transistor Q2 operates as a variable volume control device and selectively changes the speaker audio signal up and down in volume. Capacitor C27 is a DC blocking capacitor which is connected to the input of speaker amplifier 104. Capacitor C29 controls the frequency bandpass, thereby limiting the high freqency audio signal supplied to the speaker 200. Capacitors C31 and C32 are DC bypass filter capacitors which remove noise signals from the input voltage signal +V3. Resistors R54 and R55 provide a gain setting voltage divider which establishes the voltage level at an input to the audio amplifer 104. Capacitor C28 is a DC blocking capacitor for an input of amplifier 104. Capacitor C30 is the output coupling capacitor for the audio portion of the circuit. Capacitor C33 and resistor R56 provide a load at appropriate frequencies for the audio output terminals.

Other systems on the market use different connection cables and/or internal logic. In an alternative embodiment, input terminal 1A (see FIG. 1) is used to provide compatability with these other systems. In this alternative embodiment, terminal 1A is connected to a current limiting resistor R58 which is especially useful in the case of a CMOS unit. A bilateral switch 105 is used as an inverter by selectively switching the output terminal thereof by means of switch SW1. Thus, in one condition, this alternative circuit arrangement is not connected via switch SW1 and the output terminal of circuit 105 is clamped at voltage +V1 via resistor R59. In the other operating condition, the output terminal of circuit 105 is connected to circuit 103 via resistor R60 and switch terminals A and C. Resistor R60 and capacitor C35 provide a filtered output signal from circuit 105 to terminal C of switch SW1 to selectively control switching circuit 103. In the alternate embodiment, switch SW1 joins terminals C and A thereby connecting the alternate input IA to circuit 103. Otherwise, terminal A of switch SW1 is connected to terminal B, whereupon and circuit 105 and alternate circuit components are disconnected from the overall system.

Diode CR1 is also connected to terminal B of switch SW1 and produces a 0.7 volt drop thereacross. This voltage drop is a triggering factor so that circuit 103 will not be on all the time. Diode CR1 is selectively driven by the "HOOK SENSE" signal at terminal J1 (see FIG. 2). In particular, the HOOK SENSE signal gates circuit 106 on via gate circuit 107 thereby connecting resistor R44 to ground. This condition switches on transistor Q1 thereby applying +V1 volts to diode CR1 (via terminal C2 in FIG. 2 which is connected to terminal C1 in FIG. 1). Also, this signal from transistor Q1 turns on inverter 108. Resistor R45 is a pull-up resistor used to switch transistor Q1 off in the absence of a low input signal from circuit 106.

The microphone input line is connected to capacitor C6 which reduces the high frequency signals supplied to the circuit. Resistors R10 and R11 are pull-up resistors which provide microphone signal bias. Capacitor C8 filters the microphone bias voltage to remove noise, audio, data and the like. This bias voltage is supplied through resistor R11 via the collector electrode of transistor Q1. Capacitor C7 is a DC blocking capacitor and resistor R12 is a current limiting resistor at the input terminals of operational amplifier 109. Capacitor C9 and resistor R13 supply the filtered voltage +V1 to amplifier 109. Resistors R14 and R15 form a voltage divider to produce the bias input signal to circuit 109. Capacitors C10, C11 and C12 are RF bypass capacitors. Resistor R16 sets the gain of the stage which includes operational amplifier 109. Capacitor C13 is a DC blocking capacitor which couples the output of the microphone amplifier 109 to the microphone input circut.

The circuitry at amplifier 110 is a band pass active audio filter. Capacitors C19 and C20 are filter capacitors at the inputs of amplifier 110. Resistors R30 and R31 form a voltage divider which controls the level of the audio input signal supplied to amplifier 110. Resistors R27, R28 and R29 set the gain and, together with resistor R32, supply the bias for amplifier 110. Capacitor C21 is a DC blocking and coupling capacitor at the output of amplifier 110. Resistor R33 and resistors R28 and R29 establish the DC bias of amplifier 111. Resistor R34 (together with capacitor C21) operates as a coupling for the audio input of amplifier 111. Amplifier 111 is the "gain shutback" or comparative amplifier which determines the microphone audio signal necessary to obtain microphone/speaker leveling. Resistors R35, R36 and R37 provide the gain loop and some biasing for amplifier 111. Resistors R41, R42 and R43 provide a circuit for adjusting the bias of amplifier 111. Thermistor TH1 is included to provide for temperature compensation. Resistor R40 is also used in the biasing at amplifier 111. Resistor R39 provides biasing in both directions to load the output. Resistor R38 also provides an output load for amplifier 111. Diode CR2 is connected to clamp the output voltage relative to the input signal. Resistor R46 and capacitor C23 form a low pass filter at the input to amplifier 112 and operate to remove microphone audio signal fluctuations from the signal supplied to amplifier 112. The voltage on capacitor C23 is supplied to an input of circuit 112 through resistor R48. Capacitor C24 is a bypass capacitor at the input terminals of comparator amplifier 112. Resistor R49 controls the switching level and feedback of amplifier 112 which feeds comparator 113 via resistor R51. In one embodiment, comparator 113 includes four (4) sets of transistor base-emitter junctions connected as diodes which conduct when a specified voltage is reached. This voltage depends upon the audio input signal and the gain shutback control that changes in response to the audio input level from the microphone. Current limiting resistor R47 is connected to supply inverter 108 which produces a voltage to control transistor Q2 which supplies the audio leveling control for the speaker 200. Resistor R52 is part of the current limiting and time constant circuit associated with the base-emitter junction of transistor Q2. Capacitor C25 controls the time delay for the circuit. Diode CR3 is included to permit instant "on" but slow "off" operation of transistor Q2.

The microphone audio signal from amplifier 109 passes through capacitor C13 and, via the connection of terminal A2 (see FIG. 2) to terminal A1 (see FIG. 1), resistor R20 to amplifier 114 where the signal is amplified. Capacitor C16 is a bypass capacitor. Resistor R20, is connected, via connector terminal B1 (see FIG. 1) and terminal B2 (see FIG. 2), to capacitor C18 and circuit 113 in order to form the transmit audio gain leveling circuit. Resistors R19 and R17 form a voltage divider for biasing amplifier 114 relative to +V2. Resistor R21 is used to set the transmit audio gain for the system. Resistor R25 and capacitor C14 provide coupling for one side of the balanced audio output. Resistors R23 and R24 provide the gain setting circuit for amplifier 115 which produces the inverted audio signal for the balanced audio output. Capacitor C17 is a bypass capacitor at the input of circuit 115. Resistor R26 and capacitor C15 are an output circuit similar to resistor R25 and capacitor C14 but for the other side of the balanced audio output.

In operation, the microphone circuit amplifies the microphone signal to the proper level. The gain shutback circuitry operates at a specific audio frequency range, typically voice frequency, so that ambient or background noise will not cause adverse problems. The microphone circuit also shapes the input audio to a desirable form. The gain shutback circuit provides an analog output that goes up and down depending upon the voice input signal. It also provides a "kick-in" point at which the transmit audio gain is increased significantly. Thus, the audio signal level does not drop out, it is merely reduced. This produces a microphone-squelching-type of action which causes the audio to be greatly reduced but not eliminated. Thus, in a telephone application the caller does not have the effect that no one is on the other end of the line. That is, the user can still hear the caller, just not as loud. This arrangement also prevents feedback. The analog signal produced by the gain shutback circuit changes the speaker volume at the same time the transmit audio changes. Thus, when the transmit audio network has high gain, the speaker gain is reduced a moderate amount, and vice versa to avoid feedback. The output audio signal is also shaped so that the higher frequency of the audio signal that, generally, tends to produce undesirable feedback is removed or reduced. The speaker leveling circuit, does not necessarily reduce all of the audio evenly. Rather, it tends to reduce the high frequencies more than it reduces the low frequencies. Thus, a substantial portion of the audible audio signal comes through even when the hands-free caller is talking. Thus, there is obtained a teeter-totter effect so that when the microphone is active, the speaker output is reduced. This interaction permits duplex operation. Also, it produces an AGC effect which tends to level the gain in a high noise environment. That is, the speaker gain may go down but the microphone gain will rise. Thus, if a very weak sounding party is on the other end with little or no background noise the receiver signal comes up. Conversely, if the person on the receiver end is very loud, the incoming signal will be received in the microphone circuit and come to a leveling point so that it cannot feedback.

The Rx audio signal is the input signal which is being listened to. The microphone signal is the signal which is generated by a person speaking. From a telephone point of view the Rx audio input terminals are akin to the ear piece and the microphone terminal is akin to the mouthpiece. The circuits come together and work back and forth so that duplex operation can be obtained without one cutting the other off.

The Hook Sense circuit 107 detects when the receiver is lifted. In particular, the Hook Sense signal is high when the receiver is on the hook and low when the receiver is taken off the hook. This off hook condition causes circuit 106 to go low and turns on the transistor Q1 which supplies the audio control signal through diode CR1 to circuit 103. Thus, versatility is achieved so that the logic turns the speaker and the microphone on and off. As well as turning the speaker off, it turns off the microphone bias so that there is no microphone audio and it also disables the speaker muting circuit.

In the alternate application, there is microphone mute and a speaker mute. The speaker mute is normally in the on state all the time except in handset operation. The microphone mute is off until the phone is involved in a call and causes no reduction in the audio because the microphone cannot detect a signal. Circuit 105 is, typically, used when a dual switching apparatus is utilized.

Thus, some advantages of the circuit of this invention are the control of the muting, as well as the provision of full duplex operation, which none of the existing circuits perform. That is, neither the microphone nor the speaker is off at any given time. Moreover they are never lower than a specified level when operative. Of course, picking up the handset on the unit, will shut off the microphone and the speaker. Thus, in the hands-free operation, the unit of the instant invention functions more like a typical phone as opposed to a speaker phone wherein one party can be cutoff. The prior art devices all exhibit simplex operations wherein the circuitry frequently latches off. That is, if one party is talking, the other party is latched "off" until the first party stops talking.

The circuit of this invention is described as an improved circuit for mobile telephone units. The "hands-free" operation is similar to existing phone units in providing duplex operation. By using a directional, noise cancelling microphone, the advantageous results are achieved. The circuit, as described, includes the ability to interface with a number of input (Rx audio) arrangements. Also, the device operates without the hands-free approach. All of the components of this circuit are readily available on the market.

A specific arrangement of the components is shown and described. Those skilled in the art may conceive modifications and alterations to the specific circuit. Any such modifications which fall within the purview of this description are to be included therein as well. This description is intended to be illustrative only and is not intended to be limitative of the invention. The scope of the invention is limited only by the scope of the claims appended hereto.

We claim:

1. For use with a portable telephone system including a telephone control unit and a signal transceiver unit, a telephone control circuit comprising, audio input means for operating on an audio input signal received from said signal transceiver unit, audio output means for producing an audio output signal for transmission to said signal transceiver unit, microphone input means for producing a microphone audio signal, amplifier means connected between said microphone input means and said audio output means to control the magnitude of said audio output signal produced in response to said microphone audio signal produced by said microphone input means, and said audio output means includes first amplifier circuit means connected to said microphone input means for amplifying the microphone audio signal produced by said microphone input means in order to produce said audio output signal, said audio output means includes second amplifier circuit means connected to said first amplifier circuit means to produce an inverted audio output signal which, together with the audio output signal produced by said first amplifier circuit means, produces a balanced audio output signal, speaker means connected to said audio input means and operative to produce an audible output signal in response to the audio input signal received by said audio input means, volume control means connected between said audio input means and said speaker means to control the volume of said audible output signal, control means connected to said audio input means and to said microphone input means to selectively permit connection of said audio input means and said microphone input means to said speaker means, and audio leveling circuit means connected between said amplifier means and said speaker means to control the level of the signal supplied to said speaker means by said amplifier means in response to said microphone audio signal.

2. The circuit recited in claim 1 wherein, said audio leveling circuit means adjusts the audio input signal and the microphone audio signal relative to each other and thereby permits said microphone input means and said speaker means to be operative simultaneously thereby to permit bidirectional communication.

3. The circuit recited in claim 1 wherein, said audio input means includes audio amplifier means for receiving balanced audio input signals and producing a single ended audio output signal.

4. The circuit recited in claim 3 including, a balanced termination for an input cable connected to the inputs of said audio amplifier means.

5. The circuit recited in claim 3 including, gating means connected to an output of said audio amplifier means and selectively activated by a control signal to pass audio input signals from said audio amplifier means.

6. The circuit recited in claim 5 including,
sensing means for sensing the "off-hook" status of said telephone control unit and producing said control signal in response thereo.

7. The circuit recited in claim 1 including,
further amplifier means connected to said amplifier to amplify the signal produced by said microphone input means via said amplifier means and supply the amplified signal produced by said further amplifier means to said audio leveling circuit means.

8. The circuit recited in claim 1 including,
speaker amplifier means connected to supply signals to said speaker means from each of said volume control means and said audio leveling circuit means.

9. The circuit recited in claim 5 including,
inverter means connected to receive an audio input signal from said audio input and supply same to said gating means for selective application to said speaker means.

10. The circuit recited in claim 1 including,
gain control means connected at an output of said amplifier means to control the gain of the telephone control circuit.

11. The circuit recited in claim 10 wherein,
said gain control means includes comparator amplifier means for adjusting the gain of the circuit.

12. The circuit recited in claim 11 including,
temperature compensation means connected to said comparator amplifier means.

13. The circuit recited in claim 1 including,
comparator means connected between said audio leveling circuit means and said amplifier means to control the gain of said audio output means.

14. The telephone control circuit recited in claim 1 wherein,
said telephone control circuit and all of the components thereof operates only on analog signals.

15. A control circuit for use in controlling and permitting simultaneous bidirectional operation of a mobile telephone,
input means for receiving an input audio signal,
first amplifier means connected to said input means to produce a single-ended audio signal representative of said input audio signal,
first volume control means connected to said first amplifier means to control the magnitude of said single-ended audio signal,
audio amplifier means connected to said volume control means to amplify the signal supplied to said audio amplifier means by said volume control means,
first transducer means connected to said audio amplifier means to produce an audible output signal representative of the signal produced by said audio amplifier means,
second transducer means for producing signals representative of audible tones,
second amplifier means connected to said second transducer means to amplify the signals produced by said second transducer means,
reference signal means,
gain control means connected to said second amplifier means and said reference signal means and operative to compare the reference signal produced by said reference signal means and the signal produced by said second amplifier means,
control means selectively activated by a signal from said mobile telephone and connected to selectively clamp said gain control means and said input means thereby to inhibit operation of said control circuit.
second volume control means connected from said gain control means to said first transducer means to control the audible output signal produced by said first transducer means in response to the operation of said gain control means,
output means for supplying an output audio signal to the transmitter portion of a mobile telephone, and
transmit amplifier means connected to receive signals from said second amplifier means and from said gain control means and operative to supply signals representative of the combination thereof to said output means, thereby to substantially balance the effect of the signals produced by said second transducer means and the signal produced by said audio amplifier means and supplied to said first transducer means.

16. The circuit recited in claim 15 wherein,
said output means produces a balanced, double-ended output audio signal.

17. The circuit recited in claim 15 wherein,
said mobile telephone includes a handset portion and a cradle portion, and
said control means is selectively activated by a signal produced by the mobile telephone when the handset portion of the mobile telephone is removed from the cradle portion of the mobile telephone.

18. An analog control circuit for use in controlling and permitting simultaneous bidirectional operation of a mobile telephone,
receiver means with two audio inputs for receiving a balanced input audio signal,
first amplifier means connected to said receiver means to produce a single-ended audio signal representative of said balanced audio signal,
potentiometer means connected to the output of said first amplifier means to control the magnitude of said single-ended audio signal,
audio amplifier means connected to said potentiometer means to amplify the signal supplied to said audio amplifier means by said potentiometer means,
speaker means connected to said audio amplifier means to produce an audible output signal representative of the signal produced by said audio amplifier means,
microphone means for producing signals representative of audible tones,
second amplifier means connected to said microphone means to amplify the signals produced by said microphone means,
gain control means connected to said second amplifier means and operative to produce a comparator signal representative of the signal produced by said second amplifier means,
clamp means selectively activated by a signal from said mobile telphone and connected to selectively clamp said gain control means and said receiver means thereby to inhibit operation of said control circuit,
volume control means connected between said gain control means and said speaker means to control the volume of the audible output signal produced by said speaker means in response to the operation of said gain control means, comparator means connected to receive said comparator signal from said gain control means and to produce comparator output signals representative of said comparator signal produced by said gain control means, output means for supplying an output audio signal to the transmitter portion of a mobile telephone, and transmit amplifier means connected to receive signals from said second amplifier means and from said comparator means and operative to supply signals representative of the combination thereof to said output means, thereby to substantially balance the effect of the signals produced by said microphone means and the signal produced by said audio amplifier means and supplied to said speaker means whereby duplex operation of the circuit is permitted.

* * * * *